(12) United States Patent
Ran

(10) Patent No.: US 10,297,137 B2
(45) Date of Patent: May 21, 2019

(54) APPARATUS AND METHOD FOR PROCESSING VEHICLE EMERGENCY CONDITIONS

(71) Applicant: Robert Bosch GmbH, Stuttgart (DE)

(72) Inventor: Meng Ran, Suzhou (CN)

(*) Notice: Subject to any disclaimer, the term of this patent is extended or adjusted under 35 U.S.C. 154(b) by 0 days.

(21) Appl. No.: 15/636,834

(22) Filed: Jun. 29, 2017

(65) Prior Publication Data

US 2018/0005512 A1  Jan. 4, 2018

(30) Foreign Application Priority Data

Jun. 30, 2016  (CN) .......................... 2016 1 0510898

(51) Int. Cl.
| | |
|---|---|
| *G08B 21/22* | (2006.01) |
| *B60H 1/00* | (2006.01) |
| *G08B 21/02* | (2006.01) |
| *G08B 21/04* | (2006.01) |

(52) U.S. Cl.
CPC ......... *G08B 21/22* (2013.01); *B60H 1/00421* (2013.01); *B60H 1/00757* (2013.01); *B60H 1/00778* (2013.01); *B60H 1/00821* (2013.01); *B60H 1/00978* (2013.01); *G08B 21/02* (2013.01); *G08B 21/043* (2013.01); *G08B 21/0461* (2013.01); *G08B 21/0469* (2013.01)

(58) Field of Classification Search
CPC ............ B60H 1/00421; B60H 1/00757; B60H 1/00778; B60H 1/00821; B60H 1/00978; G08B 21/02; G08B 21/043; G08B 21/0461; G08B 21/0469; G08B 21/22

USPC ........................................................ 340/517
See application file for complete search history.

(56) References Cited

U.S. PATENT DOCUMENTS

| | | | | |
|---|---|---|---|---|
| 6,639,512 | B1* | 10/2003 | Lee | G08B 21/02 340/425.5 |
| 9,227,484 | B1* | 1/2016 | Justice | B60N 2/002 |
| 9,845,050 | B1* | 12/2017 | Garza | B60Q 9/00 |
| 2016/0049061 | A1* | 2/2016 | Scarborough | B60N 2/002 340/449 |
| 2016/0223662 | A1* | 8/2016 | Herbel | G01S 13/86 |
| 2016/0249191 | A1* | 8/2016 | Avrahami | H04L 67/12 |
| 2017/0043783 | A1* | 2/2017 | Shaw | B60H 1/00978 |
| 2018/0099592 | A1* | 4/2018 | Curry, V | B60N 2/879 |

* cited by examiner

*Primary Examiner* — Hirdepal Singh
(74) *Attorney, Agent, or Firm* — Michael Best & Friedrich LLP

(57) ABSTRACT

The invention relates to electronic technologies in automobile, and in particular, to an apparatus and method for processing vehicle emergency conditions. The apparatus for processing vehicle emergency conditions according to an aspect of the invention comprises: a first sound sensor disposed inside the vehicle; and a processing unit coupled with the first sound sensor, which is configured to determine whether an individual inside the vehicle is in an emergency condition according to signals collected by the first sound sensor and an internal environmental state of the vehicle, and to generate a command or instruction signal for executing emergency processing operation when the individual inside the vehicle is in an emergency condition.

7 Claims, 3 Drawing Sheets

APPARATUS AND METHOD FOR PROCESSING VEHICLE EMERGENCY CONDITIONS

FIELD OF THE INVENTION

The invention relates to electronic technologies in automobile, and in particular, to a method for processing vehicle emergency conditions, a processing unit for realizing the method, and an emergency condition processing apparatus comprising the processing unit.

BACKGROUND

In daily life, there are often careless parents who leave their young child in the car alone for convenience. Such activities are very dangerous for children with weak behavioral competence. Since the vehicle door is typically locked after parents leave the vehicle and the vehicle engine is shut down, internal temperature of the vehicle will be increased very quickly in summer, and oxygen content in the air will be decreased rapidly. Moreover, due to being terrified and hopeless, the child will cry and shout loudly, which will further aggravate the severity of the event. If this emergent situation is not found timely and no rescue is provided, the child may possibly die of suffocation. For example, according to news media's report, several such tragedy events occurred in China in a single year of 2015.

As can be seen from the above, there is an urgent need for an apparatus and method for processing vehicle emergency conditions, which can timely and accurately find dangerous situations and take corresponding countermeasures.

SUMMARY OF THE INVENTION

An object of the invention is to provide a processing unit which has high accuracy and high reliability in processing vehicle emergency conditions.

The processing unit according to an aspect of the invention is adapted to communicate with a first sound sensor disposed inside a vehicle and is configured to execute the following operations:

Determining whether an individual inside the vehicle is in an emergency condition according to signals collected by the first sound sensor and an internal environmental state of the vehicle, and generating a command or instruction signal for executing emergency processing operation when the individual inside the vehicle is in an emergency condition.

Preferably, the above processing unit is configured to determine whether the individual inside the vehicle is in an emergency condition in the following way:

identifying a crying voice segment from the collected signals;

determining whether the individual inside the vehicle is in an abnormal state according to a characteristic in the crying voice segment that is associated with signal energy; and determining that the individual inside the vehicle is in an emergency condition if the individual inside the vehicle is in an abnormal state and the internal environmental state of the vehicle satisfies a preset condition.

Preferably, in the above unit, the characteristic associated with signal energy is at least one of the following items: an energy percentage of signals in the crying voice segment that are higher than a frequency threshold; and an energy percentage of signals in the crying voice segment that are higher than an energy spectrum density threshold.

Preferably, in the above unit, the internal environmental state of the vehicle comprises at least one of the following items: internal temperature of vehicle; on-off state of vehicle window and seatbelt state; and the preset condition is at least one of the following: the internal temperature of vehicle being higher than a temperature threshold, vehicle window being closed and front seatbelt not being activated.

Preferably, in the above unit, the emergency processing operation comprises at least one of the following: sound alarming, opening vehicle window and activating air conditioner.

Another object of the invention is to provide an apparatus for processing emergency conditions of vehicle, which has such advantageous as high accuracy and high reliability.

The apparatus for processing emergency conditions of vehicle according to an aspect of the invention comprises:

a first sound sensor disposed inside the vehicle; and a processing unit coupled with the first sound sensor, which is configured to determine whether an individual inside the vehicle is in an emergency condition according to signals collected by the first sound sensor and an internal environmental state of the vehicle, and to generate a command or instruction signal for executing emergency processing operation when the individual inside the vehicle is in an emergency condition.

Preferably, in the above apparatus for processing emergency conditions of vehicle, the processing unit is configured to determine whether the individual inside the vehicle is in an emergency condition in the following way:

identifying a crying voice segment from the collected signals;

determining whether the individual inside the vehicle is in an abnormal state according to a characteristic in the crying voice segment that is associated with signal energy; and determining that the individual inside the vehicle is in an emergency condition if the individual inside the vehicle is in an abnormal state and the internal environmental state of the vehicle satisfies a preset condition.

Preferably, in the above apparatus for processing emergency conditions of vehicle, the characteristic associated with signal energy is at least one of the following items: an energy percentage of signals in the crying voice segment that are higher than a frequency threshold; and an energy percentage of signals in the crying voice segment that are higher than an energy spectrum density threshold.

Preferably, in the above apparatus for processing emergency conditions of vehicle, the internal environmental state of the vehicle comprises at least one of the following items: internal temperature of vehicle; on-off state of vehicle window and seatbelt state; and the preset condition is at least one of the following: the internal temperature of vehicle being higher than a temperature threshold, vehicle window being closed and front seatbelt not being activated.

Preferably, in the above apparatus for processing emergency conditions of vehicle, the first sound sensor is disposed at the top of vehicle, and the azimuth angle for signal receiving is set to cover the interior of vehicle.

Preferably, in the above apparatus for processing emergency conditions of vehicle, a second sound sensor disposed outside the vehicle is further comprised, and the processing unit is configured to determine whether the sound source is located inside the vehicle or outside the vehicle by comparing intensities of signals collected by the first sound sensor and the second sound sensor, before a crying voice segment is identified from the signals collected by the first sound sensor.

Preferably, in the above apparatus for processing emergency conditions of vehicle, the emergency processing operation comprises at least one of the following: sound alarming, opening vehicle window and activating air conditioner. Further another object of the invention is to provide a method for processing emergency conditions of vehicle, which has such advantageous as high accuracy and high reliability.

The method for processing emergency conditions of vehicle according to an aspect of the invention comprises the following steps:

receiving collected signals from a sound sensor disposed inside the vehicle;

determining whether an individual inside the vehicle is in an emergency condition according to collected signals and an internal environmental state of the vehicle; and generating a command or instruction signal for executing emergency processing operation when the individual inside the vehicle is in an emergency condition.

BRIEF DESCRIPTION OF THE DRAWINGS

The above and/or other aspects and advantageous of the invention will become more clear and will be more easily understood below with reference to various aspects of the accompanying drawings. Identical or similar elements in the drawings are denoted by identical reference signs, wherein.

DETAILED DESCRIPTION OF THE INVENTION

The invention will be more fully described below with reference to the accompanying drawings showing illustrative embodiments of the invention.

Figure 1:
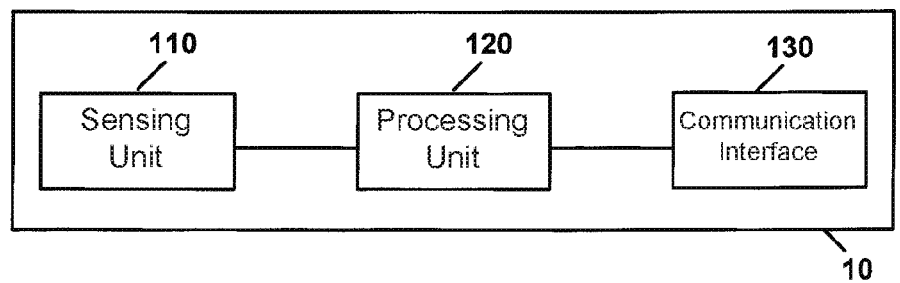
FIG. 1 is a block diagram of the apparatus for processing emergency conditions of vehicle according to an embodiment of the invention.

FIG. 1 is a block diagram of the apparatus for processing emergency conditions of vehicle according to an embodiment of the invention.

The apparatus shown in FIG. 1 comprises a sensing unit 110, a processing unit 120 and a communication interface 130. The processing unit 120 is communicated with the sensing unit 110 so as to receive sound signals collected by the sensing unit; in addition, the processing unit 120 is also communicated with the communication interface 130 so as to establish communication with an external device.

The sensing unit 110 comprises one or more first sound sensor(s) disposed inside the vehicle. Preferably, the first sound sensor is a sound sensing device which merely receives sound signals in a specific range of azimuth angles, and is disposed at the top of vehicle so that its azimuth angle for signal receiving can cover the interior of vehicle. Optionally, the sensing unit 110 may further comprise a second sound sensor disposed outside the vehicle, and the processing unit 120 can determine whether the sound source is located inside the vehicle or outside the vehicle by comparing intensities of signals collected by the first sound sensor and the second sound sensor.

The processing unit 120 performs front-end processing on the sound signals collected by the first sound sensor in the sensing unit 110, and determines whether an individual (e.g., a child) inside the vehicle is in an emergency condition according to signal characteristic and an internal environmental state of the vehicle. The processing unit 120 also executes emergency processing operation in response to the determination that the individual inside the vehicle is in an emergency condition.

In this embodiment, the front-end processing performed by the processing unit 120 on the collected sound signals mainly comprises pre-processing and characteristic extracting. The pre-processing comprises executing operations of pre-emphasizing, frame separating, windowing and end points detecting in sequence on sound signals so as to identify voice segments of individual crying (i.e., to determine starting position and ending position of crying). For Details about pre-processing, reference can be for example made to documents such as "Digital processing of speech signal" published by Electronic Industry Publishing House in 1995 and "Computer speech technology" published by Beijing Aeronautics and Astronautics University Publishing House in 2002. These technical documents are incorporated into this application by reference in their entities.

Figure 2A:
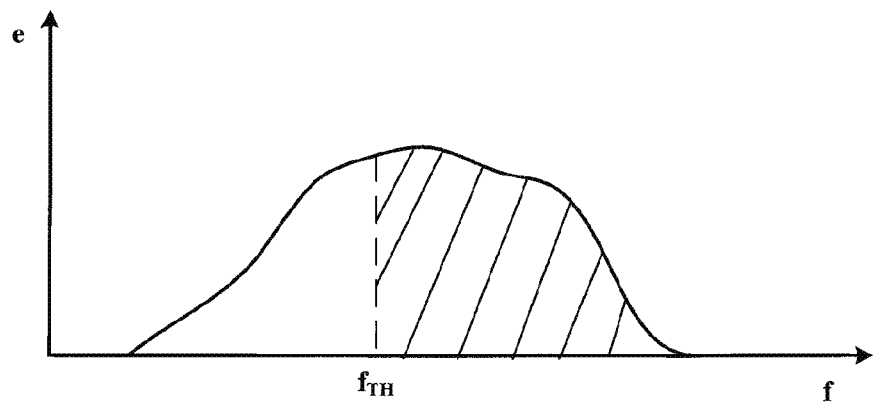
FIGS. 2a and 2b are illustrative schematic views showing energy spectrum density of the crying voice segment.

After the crying voice segment is identified, the processing unit 120 will extract a characteristic associated with signal energy in the crying voice segment and determine whether an individual inside the vehicle is in an abnormal state according to the extract characteristic. Preferably, the characteristic associated with signal energy mentioned herein can be frequency distribution characteristic of signal energy (e.g., energy percentage of signals higher than a frequency threshold). FIG. 2a is an illustrative schematic view of energy spectrum density of the crying voice segment, wherein the horizontal axis represents frequency f, and the longitudinal axis represents normalized energy spectrum density e (e.g., a ratio of actual value of energy spectrum density and the maximum value). The energy percentage of signals higher than a frequency threshold can be determined according to the following formula:

$$\eta_1 = \frac{E(f_{TH})}{E_{Total}} \quad (1)$$

wherein $\eta_1$ is energy percentage of signals higher than a frequency threshold (frequency $f_{TH}$ in FIG. 2a), $E(f_{TH})$ is the energy of signals higher than the frequency threshold (the area of the shadow region in FIG. 2a), and $E_{Total}$ is a total signal energy of the energy spectrum (i.e., the area surrounded by the power spectrum density curve in FIG. 2a).

Figure 2B:
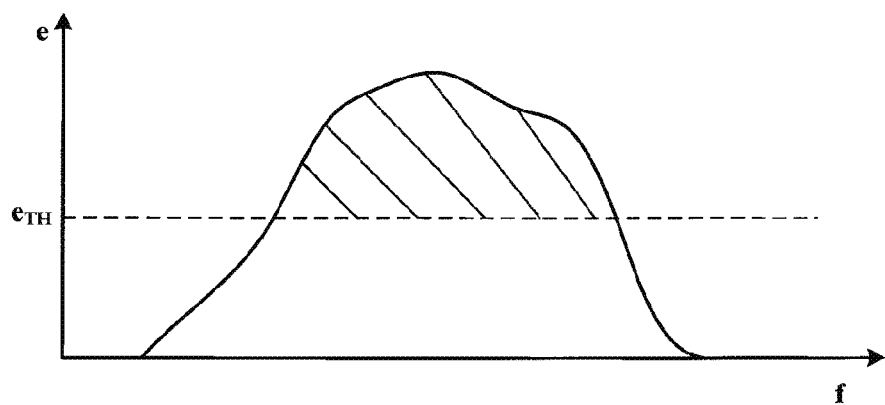

The above characteristic associated with the signal energy can be also density distribution characteristic of signal energy (e.g., energy percentage of signals higher than energy spectrum density threshold). FIG. 2b is an illustrative schematic view of energy spectrum density of the crying voice segment, wherein the horizontal axis represents frequency f, and the longitudinal axis represents normalized energy spectrum density e (e.g., a ratio of actual value of energy spectrum density and the maximum value). The energy percentage of signals higher than an energy spectrum density threshold can be determined according to the following formula:

$$\eta_2 = \frac{E(e_{TH})}{E_{Total}} \quad (2)$$

wherein $\eta_2$ is energy percentage of signals higher than a power spectrum density threshold (energy spectrum density threshold $e_{TH}$ in FIG. 2b), $E(e_{TH})$ is the energy of signals higher than the energy spectrum density threshold (the area of the shadow region in FIG. 2b), and $E_{Total}$ is a total signal energy of the power spectrum (i.e., the area surrounded by the power spectrum density curve in FIG. 2b).

Then, the processing unit 120 determines whether the individual inside the vehicle is in an abnormal state according to the characteristic associated with signal energy. For example, the processing unit 120 can judge whether the determined energy percentage $\eta_1$ of signals higher than the frequency threshold falls within a preset range $R_1$; if the determined energy percentage $\eta_1$ of signals higher than the frequency threshold falls within the preset range $R_1$, it is determined that the individual inside the vehicle is in an abnormal state. As another example, the processing unit 120 can judge whether the determined energy percentage $\eta_2$ of signals higher than the energy spectrum density threshold falls within a preset range $R_2$; if the determined energy percentage $\eta_2$ of signals higher than the energy spectrum density threshold falls within the preset range $R_2$, it is determined that the individual inside the vehicle is in an abnormal state. Alternatively, the processing unit 120 can judge whether the determined energy percentage $\eta_1$ of signals higher than the frequency threshold and the determined energy percentage $\eta_2$ of signals higher than the energy spectrum density threshold fall within their respective preset ranges, and if they do, it is determined that the individual inside the vehicle is in an abnormal state.

If it is determined that the individual inside the vehicle is in an abnormal state, the processing unit 120 further determines whether the internal environment state of vehicle satisfies a preset condition. If the preset condition is satisfied, it is determined that the individual inside the vehicle is in an emergency condition. The internal environmental state of the vehicle described herein comprises at least one of the following items: internal temperature of vehicle; on-off state of vehicle window and seatbelt state; and the preset condition is at least one of the following: the internal temperature of vehicle being higher than a temperature threshold, vehicle window being closed and front seatbelt not being activated. In this embodiment, the processing unit 120 can be connected to CAN bus of vehicle via the communication interface 30 so as to acquire various parameters associated with the internal environmental state of the vehicle.

When it is determined that the individual inside the vehicle is in an emergency condition, the processing unit 120 will generate a command or instruction signal for executing emergency operation. In this embodiment, the emergency processing operation comprises at least one of the following: sound alarming, opening vehicle window and activating air conditioner.

It is noted that the processing unit in this application should be broadly interpreted as system and device that can implement the above described various functions. Examples of such system and device include but are not limited to microprocessor, central processor unit (CPU), microcontroller unit (MCU), digital signal processor (DSP), embedded system, system-on-chip (SoC), application specific integrated circuit, field programmable gate array, etc.

Figure 3:
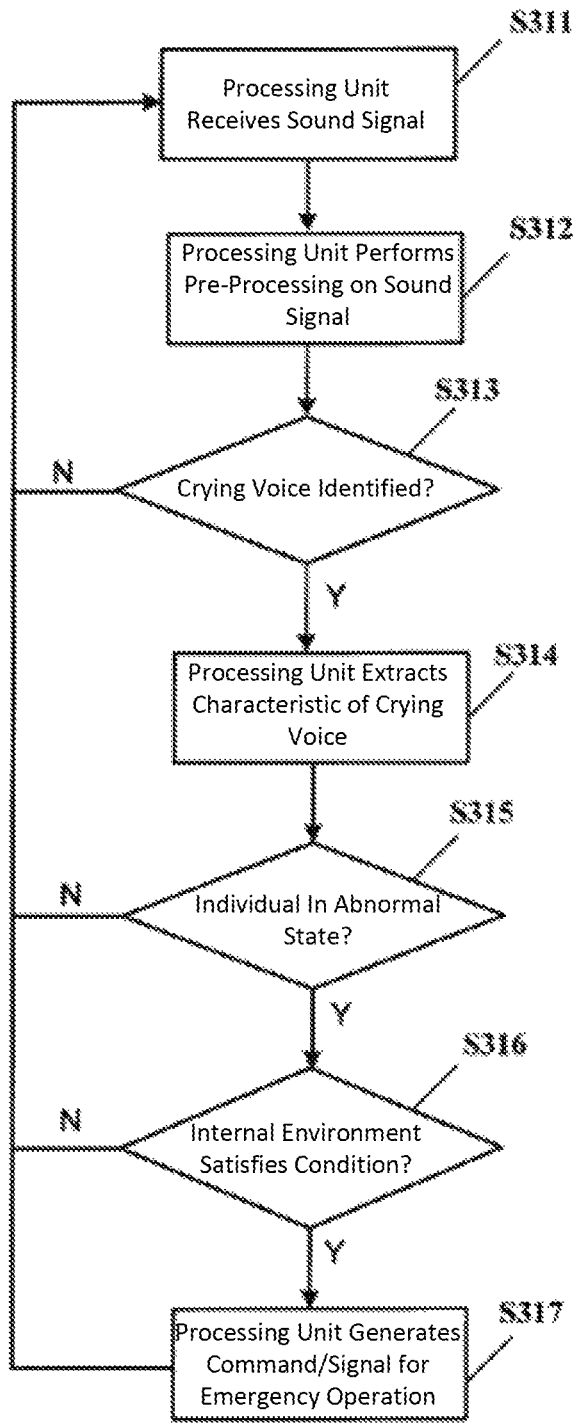
FIG. 3 is a flowchart of the method for processing emergency conditions of vehicle according to an embodiment of the invention.

FIG. 3 is a flowchart of the method for processing emergency conditions of vehicle according to an embodiment of the invention. By way of example, the apparatus 10 shown in FIG. 1 is used herein to implement the embodiment shown in FIG. 3. However, it will be appreciated by those skilled in the art that the method illustrated in this embodiment is not limited to a physical device having a particular structure.

As shown in FIG. 3, at step S311, the processing unit 120 receives sound signals collected by the first sound sensor disposed inside the vehicle from the sensing unit 110.

Then, at step S312, the processing unit 120 performs pre-processing on the sound signals received at step S311. As described above, the pre-processing comprises executing operations of pre-emphasizing, frame separating, windowing and end points detecting in sequence on the sound signals.

Next, at step S313, if it is determined that a crying voice segment of individual is identified in the pre-processed signals, the method proceeds to step S314; otherwise, the method returns to step S311.

At step S314, the processing unit 120 extracts a characteristic in the crying voice segment that is associated with signal energy. In this embodiment, the characteristic associated with signal energy can be frequency distribution characteristic of signal energy and/or density distribution characteristic of signal energy.

Then, at step S315, the processing unit 120 determines whether the individual inside the vehicle inside the vehicle is in an abnormal state according to the characteristic in the crying voice segment that is associated with signal energy. If the individual is in an abnormal state, the method proceeds to step S316; otherwise, the method returns to step S311. Specific ways of determining the abnormal state have been described above and will not be discussed anymore.

At step S316, the processing unit 120 determines whether the internal environment state of vehicle satisfies a preset condition; if the preset condition is satisfied, the method proceeds to step S317; otherwise, the method returns to step S311.

At step S317, the processing unit generates a command or instruction signal for executing emergency operation.

Figure 4:
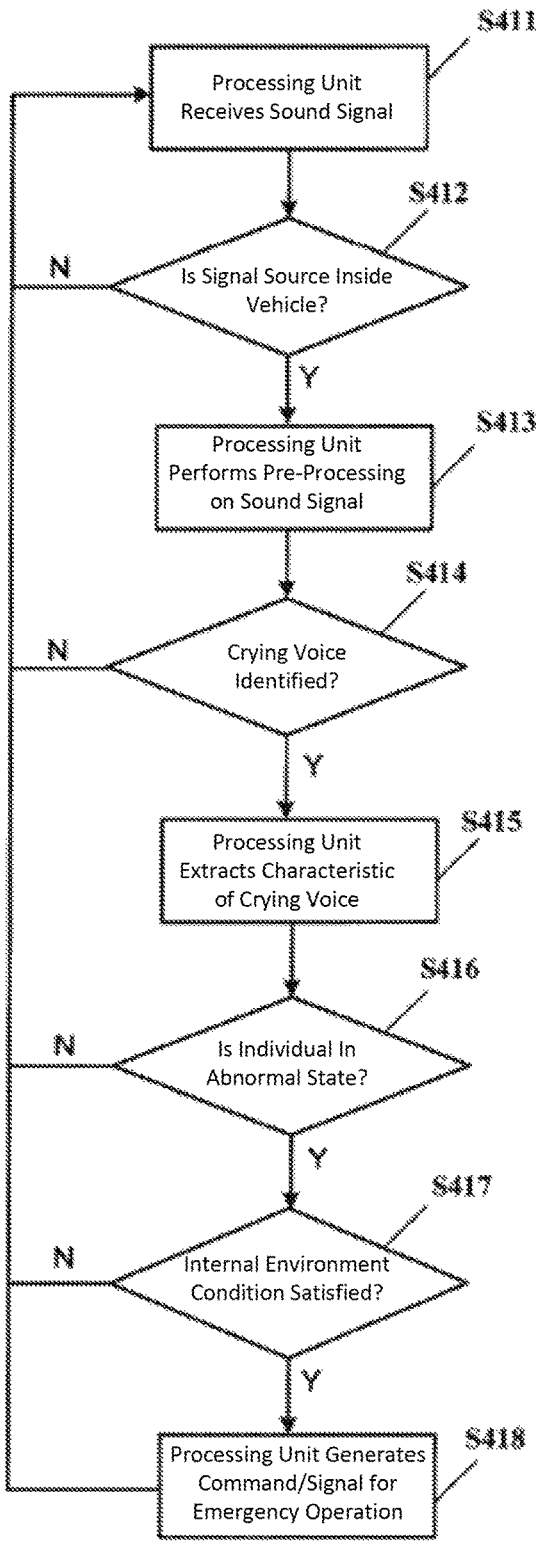
FIG. 4 is a flowchart of the method for processing emergency conditions of vehicle according to another embodiment of the invention.

FIG. 4 is a flowchart of the method for processing emergency conditions of vehicle according to another embodiment of the invention. By way of example, the apparatus 10 shown in FIG. 1 is also used herein to implement the embodiment shown in FIG. 4. However, it will be appreciated by those skilled in the art that the method illustrated in this embodiment is not limited to a physical device having a particular structure.

As shown in FIG. 4, at step S411, the processing unit 120 receives sound signals collected by a first sound sensor disposed inside the vehicle and a second sound sensor disposed outside the vehicle from the sensing unit 110.

Then, at step S412, the processing unit 120 determines whether the signal source is located inside the vehicle or outside the vehicle by comparing intensities of signals collected by the first sound sensor and the second sound sensor; if the signal source is located outside the vehicle, the method proceeds to step S411; otherwise, the method returns to step S413.

At step S413, the processing unit 120 performs pre-processing on the sound signals collected by the first sound sensor, and at step S414, it is determined whether a crying voice segment of individual is identified in the pre-processed signals; the method proceeds to step S415 if the crying voice segment of individual is identified; otherwise, the method returns to step S411.

At step S415, the processing unit 120 extracts a characteristic in the crying voice segment that is associated with signal energy, e.g., as described above, the frequency distribution characteristic of signal energy and/or density distribution characteristic of signal energy.

Then, at step S416, the processing unit 120 determines whether the individual inside the vehicle inside the vehicle is in an abnormal state according to the characteristic in the crying voice segment that is associated with signal energy. If the individual is in an abnormal state, the method proceeds to step S417; otherwise, the method returns to step S411. Specific ways of determining the abnormal state have been described above and will not be discussed anymore.

At step S417, the processing unit 120 determines whether the internal environment state of vehicle satisfies a preset condition; if the preset condition is satisfied, the method proceeds to step S418; otherwise, the method returns to step S411.

At step S418, the processing unit generates a command or instruction signal for executing emergency operation.

While some aspects of the invention have already been illustrated and discussed, it will be understood by those skilled in the art that the above aspects can be changed without departing from the principle and spirit of the invention. Therefore, the scope of the invention will be defined by the appended claims and equivalents thereof.

The invention claimed is:

1. A processing unit adapted to communicate with a first sound sensor disposed inside a vehicle and is configured to execute the following operations:
   determine an internal environmental state of the vehicle;
   receive collected signals from the first sound sensor;
   identify a crying voice segment from the collected signals;
   determine whether the individual inside the vehicle is in an abnormal state according to a characteristic in the crying voice segment that is associated with signal energy, wherein the characteristic associated with signal energy is at least one selected from group consisting of an energy percentage of signals in the crying voice segment that are higher than a frequency threshold and an energy percentage of signals in the crying voice segment that are higher than an energy spectrum density threshold;
   determine that the individual inside the vehicle is in an emergency condition if the individual inside the vehicle is in an abnormal state and the internal environmental state of the vehicle satisfies a preset condition; and
   generate a command or instruction signal for executing emergency processing operation when the individual inside the vehicle is in an emergency condition.

2. The processing unit according to claim 1, wherein the internal environmental state of the vehicle comprises at least one of the following items: internal temperature of vehicle; on-off state of vehicle window and seatbelt state; and the preset condition is at least one of the following: the internal temperature of vehicle being higher than a temperature threshold, vehicle window being closed and front seatbelt not being activated.

3. The processing unit according to claim 1, wherein the emergency processing operation comprises at least one of the following: sound alarming, opening vehicle window and activating air conditioner.

4. An apparatus for processing emergency conditions of a vehicle, comprising:
   a first sound sensor disposed inside the vehicle; and
   a processing unit coupled with the first sound sensor, which is configured to
   determine an internal environmental state of the vehicle;
   receive collected signals from the first sound sensor;
   identify a crying voice segment from the collected signals;
   determine whether the individual inside the vehicle is in an abnormal state according to a characteristic in the crying voice segment that is associated with signal energy, wherein the characteristic associated with signal energy is at least one selected from the group consisting of an energy percentage of signals in the crying voice segment that are higher than a frequency threshold and an energy percentage of signals in the crying voice segment that are higher than an energy spectrum density threshold;
   determine that the individual inside the vehicle is in an emergency condition if the individual inside the vehicle is in an abnormal state and the internal environmental state of the vehicle satisfies a preset condition; and
   generate a command or instruction signal for executing emergency processing operation when the individual inside the vehicle is in an emergency condition.

5. The apparatus for processing emergency conditions of vehicle according to claim 4, wherein the first sound sensor is disposed at the top of vehicle, and the azimuth angle for signal receiving is set to cover the interior of vehicle.

6. The apparatus for processing emergency conditions of vehicle according to claim 4, further comprising
   a second sound sensor disposed outside the vehicle, and the processing unit is configured to
   determine whether the sound source is located inside the vehicle or outside the vehicle by comparing intensities of signals collected by the first sound sensor and the second sound sensor, before a crying voice segment is identified from the signals collected by the first sound sensor.

7. A method for processing emergency conditions of a vehicle, the method comprising the following steps:
   determining an internal environmental state of the vehicle;
   receiving collected signals from a sound sensor disposed inside the vehicle;
   identifying a crying voice segment from the collected signals;
   determining whether the individual inside the vehicle is in an abnormal state according to a characteristic in the crying voice segment that is associated with signal energy, wherein the characteristic associated with signal energy is at least one selected from the group consisting of an energy percentage of signals in the crying voice segment that are higher than a frequency threshold and an energy percentage of signals in the crying voice segment that are higher than an energy spectrum density threshold;
   determining that the individual inside the vehicle is in an emergency condition if the individual inside the vehicle is in an abnormal state and the internal environmental state of the vehicle satisfies a preset condition;
   generating a command or instruction signal for executing emergency processing operation when the individual inside the vehicle is in an emergency condition.

* * * * *